United States Patent [19]

Klotz

[11] Patent Number: 5,592,535
[45] Date of Patent: Jan. 7, 1997

[54] MOBILE-RADIO NETWORK WITH DEBIT ACCOUNTS

[75] Inventor: Bernhard Klotz, Stuttgart, Germany

[73] Assignee: Alcatel Sel Aktiengesellschaft, Stuttgart, Germany

[21] Appl. No.: 630,727

[22] Filed: Apr. 2, 1996

Related U.S. Application Data

[63] Continuation of Ser. No. 228,568, Apr. 15, 1994, abandoned.

[30] Foreign Application Priority Data

Apr. 16, 1993 [DE] Germany .......................... 43 12 362.7

[51] Int. Cl.⁶ ..................................................... H04Q 7/22
[52] U.S. Cl. ................................................. 379/58; 379/59
[58] Field of Search ............................... 379/58, 59, 60; 235/280; 364/408

[56] References Cited

U.S. PATENT DOCUMENTS

| | | |
|---|---|---|
| 4,831,647 | 5/1989 | D'Avello et al. . |
| 5,063,591 | 11/1991 | Jodoin . |
| 5,109,401 | 4/1992 | Hattori ........................ 379/58 |
| 5,220,593 | 6/1993 | Zicker ......................... 379/59 |
| 5,278,892 | 1/1994 | Bolliger et al. ............... 379/60 |
| 5,280,426 | 1/1994 | Edmonds ..................... 364/408 |
| 5,291,543 | 3/1994 | Freese et al. ................. 379/59 |
| 5,297,189 | 3/1994 | Chabernaud .................. 379/58 |
| 5,319,699 | 6/1994 | Kerihuel ...................... 379/58 |
| 5,321,735 | 6/1994 | Breeden et al. .............. 379/58 |
| 5,353,331 | 10/1994 | Emery et al. ................. 379/58 |
| 5,359,182 | 10/1994 | Schilling ..................... 235/280 |

FOREIGN PATENT DOCUMENTS

| | | |
|---|---|---|
| 0526118 | 2/1993 | European Pat. Off. . |
| 0459337 | 4/1991 | France . |
| 2201853 | 8/1973 | Germany . |
| 2659615 | 7/1978 | Germany . |
| 4118994 | 12/1992 | Germany . |
| 63-14563 | 1/1988 | Japan .......................... 379/58 |
| 9206549 | 4/1992 | WIPO . |

OTHER PUBLICATIONS

Duelli, Harald: "Alles uber Mobilfunk", Franzis–Verlag GmbH, Munchen, 1991, S. 26–33.
Radke, Georg–Ludwig: "Digital signalisiert". In: Funkschau, H.2, 1986, S. 43–48.
Kramer, Michael: "Das grosse GSM–Puzle". IN: Funkschau, H.6, 1992, 37—42.
"Basic fur flexiblere telecon–Dienste", Funkschau, No. 12/1991. Pp. 53–59, by: Van Bjorn Eske–Christensen, et al.
Hollev, "The GSM Short Message Service", Jan. 1991, IEEE .
ISBERG, Charging In Cordless Telecommunication Systems Jan. 1991, IEEE.
Ballard, Issenmann, and Sanchez, "Cellular Mobile Radio as an Intelligent Network Application", Electrical Communication, 1989.
Johanna Isberg, "Charging In Cordless Telecommunication Systems," 1991 IEEE.

*Primary Examiner*—Curtis Kuntz
*Assistant Examiner*—William D. Cumming
*Attorney, Agent, or Firm*—Ware, Fressola, Van Der Sluys & Adolphson

[57] ABSTRACT

A mobile-radio network (MRS) includes a mobile switching center (MSC) for receiving incoming calls from mobile-radio subscribers (A). In response to the incoming calls, certain ones of the incoming calls are selected if the respective mobile-radio subscriber (A) has a debit account assigned to it and the debit account has a credit balance. The credit balance is compared with a predetermined minimum balance (Dmin1) and a call is completed if the credit balance exceeds the predetermined minimum balance. The debit account for the respective mobile-radio subscriber is charged a unit fee. Incorporated in the mobile switching center (MSC) is a service switching point (SSP). Additionally, a service control point (SCP) is connected to the service switching point and includes an arithmetic unit (DC) for call charging. The mobile-radio network structure makes it possible to establish connections and charge incoming calls using simple exchange protocols (INAP) without having to change conventional network protocols (MAP).

13 Claims, 3 Drawing Sheets

MOBILE-RADIO NETWORK WITH DEBIT ACCOUNTS

This application is a continuation of application Ser. No. 08/228,568 filed on May 15, 1994 now abandoned.

TECHNICAL FIELD

The present invention relates to mobile-radio networks with associated debit accounts.

BACKGROUND OF THE INVENTION

In a conventional mobile-radio network, such as a GSM network, the switched calls are charged via settlement accounts. Such a settlement account (current account) is assigned to each mobile-radio subscriber. At predetermined time intervals, e.g., monthly, the balance of the respective settlement account is determined and a corresponding bill is sent to the mobile-radio subscriber. The administration of those settlement accounts, the making out of the bills, and the subsequent payment supervision require expensive computer support. Moreover, the integration of the administration of subscriber data and account data necessitates complicated encryption and protection of these data.

As a variant of the above-described charging via settlement accounts, charging via debit accounts is conceivable. Within a mobile-radio network, debit accounts are opened and administered which are assigned to one subscriber profile each. These subscriber profiles are stored on subscriber identity modules (cards) which are bought anonymously and authorize the buyer to use mobile-radio services until the credit is used up. The buyer is thus an anonymous mobile-radio subscriber whose identity is not encoded in the subscriber profile. However, the subscriber profile gives him access to the network and enables him to dispose of the charge credit.

SUMMARY OF THE INVENTION

It is an object of the invention to provide a mobile-radio network in which charging via debit accounts is effected by simple means.

This object is attained by providing a mobile-radio network having a mobile switching center (MSC) and a data base (VLR, HLR), having first means by which incoming calls from mobile-radio subscribers (A) each having a debit account assigned to them are selected, and further comprising network elements (SSP, SCP) on an intelligent network having second means by which the selected calls are switched and charged.

Another object of the invention is to provide a simple method of charging via debit accounts in such a mobile-radio network.

This object is attained by providing a method of switching and charging incoming calls in a mobile-radio network (MRS) comprising a mobile switching center (MSC) and network elements of an intelligent network, such as a service switching point (SSP) and a service control point (SCP), comprising the following steps; within the mobile switching center (MSC), incoming calls from mobile-radio subscribers (A) each having a debit account assigned to them by means of a predetermined subscriber profile (SubCAT+) are selected; and thereafter, the selected calls are switched and a connection is established if the debit account shows a predetermined credit balance (Dmin1); within the service control point (SCP), the switched call is charged by consecutively deducting a predetermined unit fee from the debit account; and within the service switching point (SSP), the connection is released if the debit account shows no credit balance.

Further advantageous aspects of the invention are defined in the subclaims.

A particular advantage of the invention is obtained through the use of an intelligent network structure in which standardized protocols are exchanged. This permits conventional and easy-to-maintain circuits and programs to be used in constructing the mobile-radio network.

Another particular advantage is obtained through the separate construction of this intelligent network, so that charging via debit accounts is independent of the normal billing in the remainder of the network, which is of conventional design. Any change in or expansion of the intelligent network does not require a change in the remainder of the network.

BRIEF DESCRIPTION OF THE DRAWINGS

A mobile-radio network according to the invention and a novel charging method in such a mobile-radio network will now be described with reference to the accompanying drawings, in which.

BEST MODE FOR CARRYING OUT THE INVENTION

Figure 1:
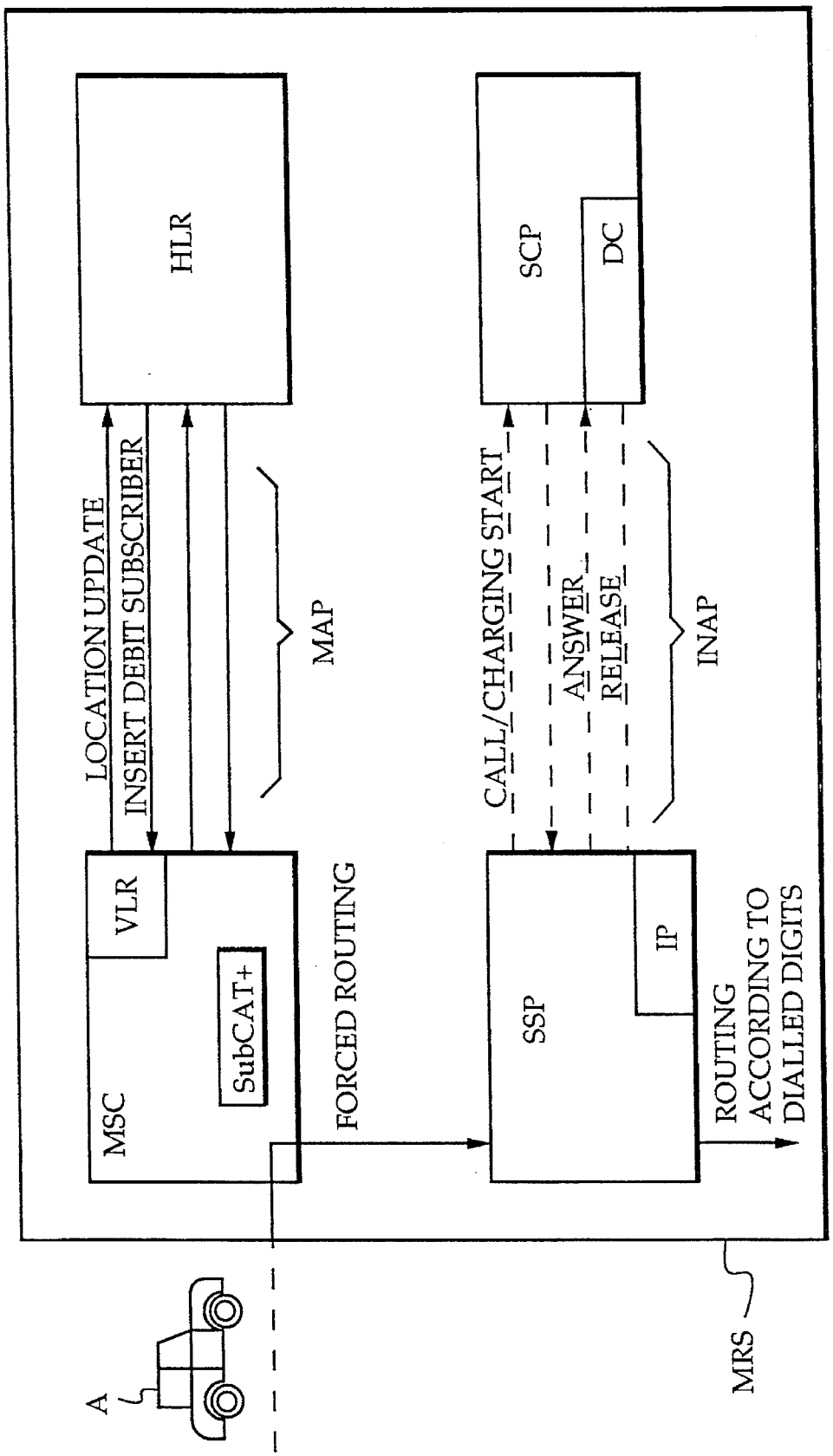
FIG. 1 shows schematically the structure of a mobile-radio network in which charging is effected via debit accounts.

FIG. 1 shows schematically those elements of a mobile-radio network MRS with which an incoming call from a mobile-radio subscriber A is switched and charged.

The mobile-radio network (MRS) shown is a GSM network. The MRS includes a mobile switching center MSC, which manages a visitor location register VLR and a home location register HLR. The mobile-radio network MRS further comprises a service switching point SSP, which is connected to the mobile switching center, and a service control point SCP, which is connected to the service switching point.

The service control point SCP and the service switching point SSP are elements of an intelligent network as is described in an article by B. Eske-Christensen et al, "Basis fur flexiblere Telecom-Dienste", Funkschau, No. 12/1991.

These network elements SSP, SCP and the mobile switching center MSC form an intelligent network structure which permits switching and charging via debit accounts. This network is provided in addition to the well-known GSM network and is accessible to those mobile-radio subscribers who have a debit account. The respective debit account is administered by means of an arithmetic unit DC within the service control point SCP.

The service control point SCP is an electronic control unit which controls the service switching point SSP by means of so-called INAP protocols (INAP: intelligent network application part). The service switching point SSP is, for example, an independent switching facility. In this embodiment, it is connected to one mobile switching center MSC. It may also be connected to two or more mobile switching centers. The mobile switching center MSC routes to the service switching point SSP incoming calls from those mobile-radio subscribers A who have a debit account which is administered within the service control point SCP. This routing of calls from such mobile-radio subscribers, henceforth called "debit subscribers", is accomplished by evaluating a predetermined subscriber profile SubCAT+. This subscriber profile contains, for example, a digital word which is composed of a bit sequence according to a conventional GSM subscriber category and an additional bit. The additional bit indicates whether the mobile-radio subscriber is a debit subscriber. The bit sequence serves to classify the subscriber in the usual manner, i.e., to determine the subscriber's tariff category, for example. Further information contained in the subscriber profile serves, on the one hand, to implement conventional network functions, such as roaming, and, on the other hand, to determine the debit account within the service control point SCP. Conventional network functions, such as roaming, are implemented by exchanging a so-called MAP protocol between the location registers HLR and VLR. To this end, the current location of the mobile-radio subscriber is determined (Location Update), and the subscriber identity contained in the subscriber profile is entered into the location register VLR which administers this location (Insert Debit Subscriber).

If a call from a debit subscriber A is detected in the mobile switching center MSC, it will be forwarded to the service switching point SSP (Forced Routing), which routes it according to the dialed digits. After this, charging is initiated (Call Start) until the call is answered at the called subscriber's end (Answer) or the service control point SCP forces a release of the connection if the credit has been used up (Release).

The service switching point SSP includes signalling means IP (Intelligent Periphery) which signal call charge information to the debit subscriber before such a release is forced. Such means are, for example, processor-controlled circuits which generate protocols in accordance with the so-called short-message service.

In this embodiment, the service switching point SSP is designed as an independent switching facility. It is also possible to integrate the service switching point SSP by using switching modules of the mobile switching center SSP for tasks of the service switching point SSP.

Figure 2A:
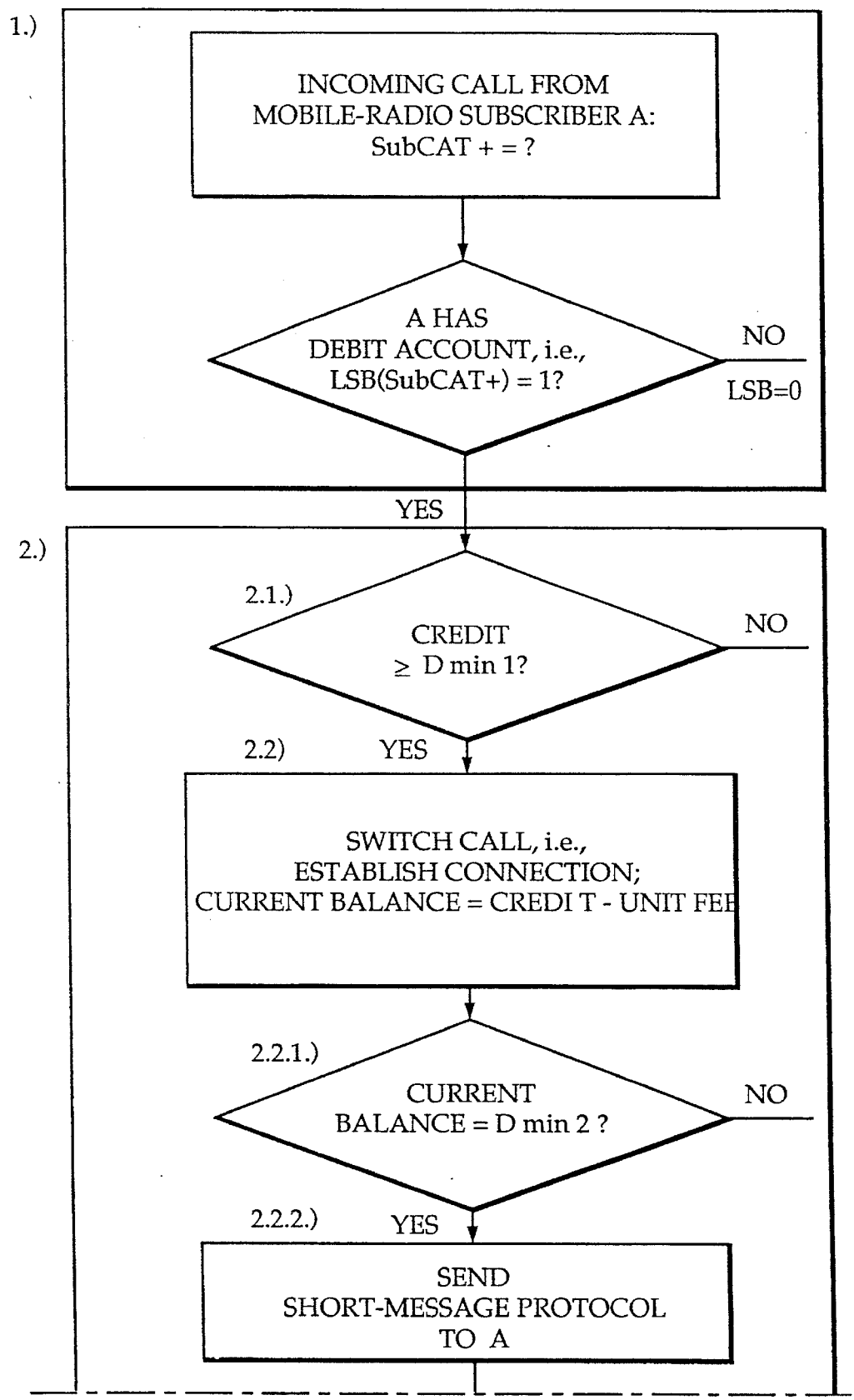
FIGS. 2A and 2B are flowcharts for carrying out the charging method.
Figure 2B:
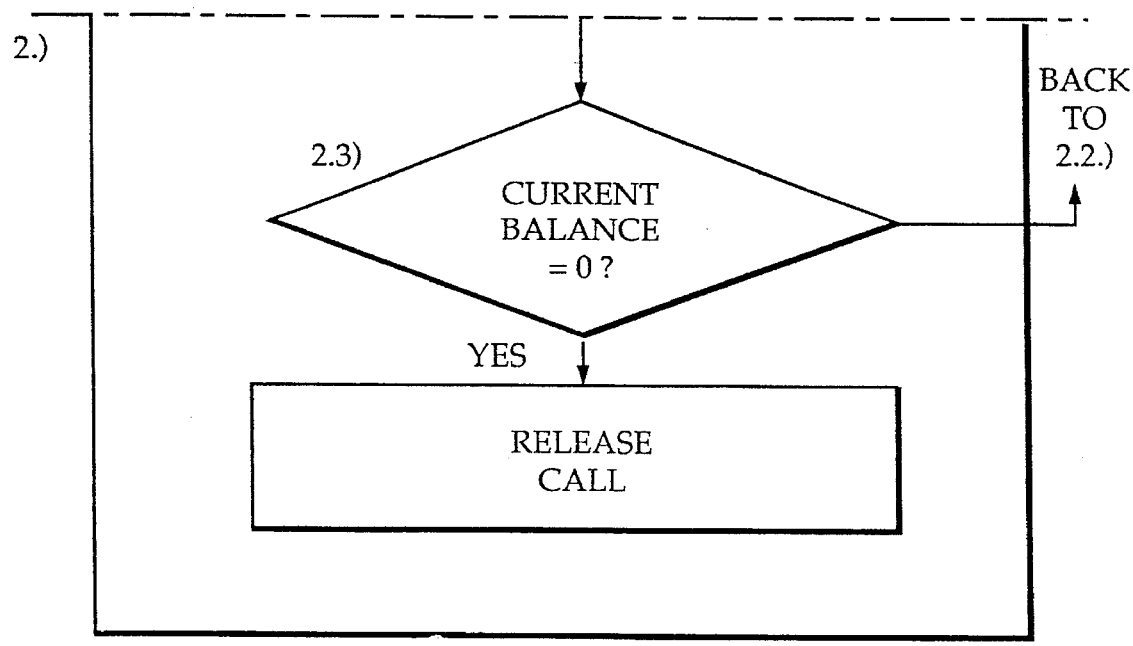

The switching and the charging via a debit account will now be described in more detail with the aid of the flowchart of FIG. 2.

In a first step 1), as soon as a call from a mobile-radio subscriber A is received in a mobile switching center, a check is made by means of a subscriber profile SubCAT+ assigned to the subscriber to see whether the latter has a debit account. The check of the additional bit, e.g., the least significant bit LSB, causes a selection of the debit subscribers from the other mobile-radio subscribers.

In a second step 2), the incoming call from the debit subscriber is switched and charged as follows:

First, the credit balance is determined and compared with a predetermined minimum balance Dmin1 of, e.g., DM 5.—, see 2.1). The call is then switched only if the debit account does not show less than this minimum credit, so that no connection will be established if a forced release threatens. The subscriber A then has to fill up his debit account, e.g., by a remittance to the mobile-radio-network operator.

If the call can be switched, charging is effected according to 2.2). After each deduction of a unit fee from the debit account, the current credit balance is determined and compared with a minimum value Dmin2, see 2.2.1. If the credit balance has reached this minimum value Dmin2 of, e.g., DM 10.—, a short-message protocol is sent via the mobile switching center to the subscriber A.

The subscriber A can read the message on the display of his mobile phone and decide whether to continue the conversation.

If the account shows no credit balance, the call will be released, see 2.3). Otherwise, charging continues according to the above-described steps of 2.2) et seq.

The mobile-radio network described and the method used therein permit intelligent switching and charging of calls which are initiated by debit subscribers. The selection of these calls and their separate treatment eliminate the need for complicated and costly administration as is necessary with calls from conventional subscribers. In the mobile-radio network, the debit subscribers are switched and charged anonymously. Through the construction of a separate intelligent network, extensions of subscriber services, such as continuous information on the current balance, are possible without the need to change the conventional structure of the mobile-radio network or conventional network protocols, such as the MAP protocol.

What is claimed is:

1. A mobile-radio network comprising:
    a mobile switching center for receiving incoming calls from mobile-radio subscribers, said mobile switching center including means responsive to said incoming calls for selecting incoming calls from mobile-radio subscribers having a predetermined subscriber profile, the predetermined subscriber profile indicating that an incoming call is from a respective mobile-radio subscriber having a debit account, and
    network elements of an intelligent network connected to said mobile switching center, said mobile switching center forwarding the selected incoming calls to said network elements, said network elements including:
    means for storing, for at least one respective mobile-radio subscriber, a debit account having a credit balance indicative of an amount of credit, and
    means responsive to a selected incoming call from the respective mobile-radio subscriber;
        for accessing the debit account of the respective mobile-radio subscriber,
        for comparing the credit balance in the debit account of the respective mobile-radio subscriber with a first predetermined minimum balance,
        for establishing a connection for the selected incoming call from the respective mobile-radio subscriber if the credit balance in the debit account of the respective mobile-radio subscriber exceeds said predetermined minimum balance,
        for, once the connection is established, charging the debit account of the respective mobile-radio subscriber by consecutively deducting a unit fee, and
        for releasing the connection for the selected incoming call if the debit account of the respective mobile radio subscriber shows no credit balance.

2. A mobile-radio network as claimed in claim 1 wherein the network elements comprise a service switching point, which is connected to or incorporated in the mobile switching center, and a service control point, which is connected to the service switching point, the service control point storing debit accounts and including an arithmetic unit for call charging.

3. A mobile-radio network as claimed in claim 2 wherein the service switching point and the service control point exchange protocols which are standardized in the intelligent network.

4. A mobile-radio network as claimed in claim 2 wherein the service switching point includes signaling means for signalling call charge information to a respective mobile-radio subscriber.

5. A mobile-radio network as claimed in claim 4 wherein the signalling means signals the call charge information in accordance with a short-message protocol when the arithmetic unit determines that the credit balance has fallen below a given amount.

6. A method of establishing a connection and charging incoming calls in a mobile-radio network comprising a mobile switching center and network elements of an intelligent network, the network elements including a service switching point which is connected to or incorporated in the mobile switching center and a service control point which is connected to the service switching point, the method comprising the following steps:

storing in the service control point, for at least one respective mobile-radio subscriber, a debit account having a credit balance indicative of an amount of credit;

receiving incoming calls from mobile-radio subscribers at the mobile switching center;

selecting incoming calls that have a predetermined subscriber profile, the predetermined subscriber profile indicating that an incoming call is from a respective mobile-radio subscriber having a debit account;

forwarding the selected calls to the service switching point;

accessing the debit account of the respective mobile-radio subscriber for each selected incoming call;

comparing the credit balance in the debit account of the respective mobile-radio subscriber to a predetermined minimum balance;

establishing a connection for a selected incoming call if the debit account of the respective mobile-radio subscriber shows a credit balance greater than the predetermined minimum balance;

once a connection is established, charging for the selected incoming call by consecutively deducting a predetermined unit fee from the debit account of the respective mobile radio subscriber; and releasing the connection for the selected incoming call if the debit account of the respective mobile radio subscriber shows no credit balance.

7. A method as claimed in claim 6 wherein the following steps are taken between the steps of charging for the selected incoming call and releasing the connection:

after each consecutive deduction of the unit fee, determining a current credit balance in the debit account of the respective mobile radio subscriber; and signaling the current credit balance to the respective mobile-radio subscriber by means of a short-message protocol.

8. A method as claimed in claim 6 wherein the following steps are taken between the steps of charging for the selected incoming call and releasing the connection:

after each consecutive deduction of the unit fee, determining a current credit balance in the debit account of the respective mobile radio subscriber; and signaling the current credit balance to the respective mobile-radio subscriber by means of a short-message protocol if the magnitude of the current credit balance corresponds to a predetermined minimum value.

9. A method as claimed in claim 8 wherein the predetermined minimum value corresponds to a predetermined credit balance.

10. A mobile-radio network as claimed in claim 1, wherein said means responsive to said incoming calls includes means for evaluating a predetermined subscriber profile contained in a digital word.

11. A mobile-radio network as claimed in claim 10, wherein said digital word includes an additional bit which indicates whether a mobile-radio subscriber has an assigned debit account.

12. A mobile-radio network as claimed in claim 2, wherein said means responsive to said incoming calls includes means for evaluating a predetermined subscriber profile contained in a digital word.

13. A mobile-radio network as claimed in claim 12, wherein said digital word includes an additional bit which indicates whether a mobile-radio subscriber has an assigned debit account stored in the service control point.

* * * * *